(12) United States Patent
Stoller

(10) Patent No.: US 8,093,550 B2
(45) Date of Patent: Jan. 10, 2012

(54) DETERMINING DOWNHOLE FLUID FLOW

(75) Inventor: Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 196 days.

(21) Appl. No.: 12/490,445

(22) Filed: Jun. 24, 2009

(65) Prior Publication Data

US 2009/0321622 A1    Dec. 31, 2009

(30) Foreign Application Priority Data

Jun. 27, 2008 (EP) .................... 08159180

(51) Int. Cl.
*G01V 5/12* (2006.01)
(52) U.S. Cl. ................................... 250/269.7
(58) Field of Classification Search ............... 250/269.7
See application file for complete search history.

(56) References Cited

U.S. PATENT DOCUMENTS

| | | | | |
|---|---|---|---|---|
| 3,465,151 | A | * | 9/1969 | Youmans ............... 376/166 |
| 4,057,720 | A | * | 11/1977 | Paap et al. ............. 376/166 |
| 4,076,980 | A | | 2/1978 | Arnold et al. |
| 4,501,964 | A | | 2/1985 | Arnold |
| 2002/0170348 | A1 | | 11/2002 | Roscoe et al. |
| 2006/0180754 | A1 | * | 8/2006 | Edwards et al. ......... 250/269.3 |
| 2007/0108380 | A1 | * | 5/2007 | Poe et al. ............... 250/269.6 |

FOREIGN PATENT DOCUMENTS

| | | |
|---|---|---|
| EP | 0188878 | 7/1986 |
| GB | 2399111 | 9/2004 |
| WO | 2007/089338 A2 | 8/2007 |

OTHER PUBLICATIONS

Peihua Z et al "A study of oxygen activation well logging technique and its applications in the oil fields" Applied Radiation and Isotopes, Elsevier, Oxford, GB, vol. 58, No. 3, Mar. 1, 2003, pp. 407-411, XP004410025, ISSN: 0969-8043.

* cited by examiner

*Primary Examiner* — Constantine Hannaher
(74) *Attorney, Agent, or Firm* — Jianguang Du

(57) ABSTRACT

Tool for drilling a borehole and method for using such tool. The tool has an apparatus for determining a change in a drilling environment around the borehole that includes a source for generating neutrons to produce a radioactive isotope in a fluid flowing down inside the tool; a detector for detecting a change in gamma-ray radiation created from decay of the radioactive isotope when the fluid flows back up outside the tool; and means for relating the detected change in the gamma-ray radiation to the change in the drilling environment that includes borehole enlargement, fluid loss from the borehole and/or fluid entry into the borehole.

21 Claims, 4 Drawing Sheets

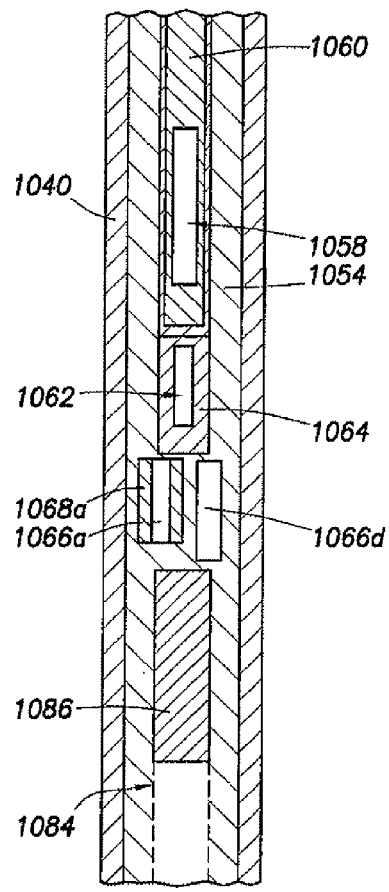
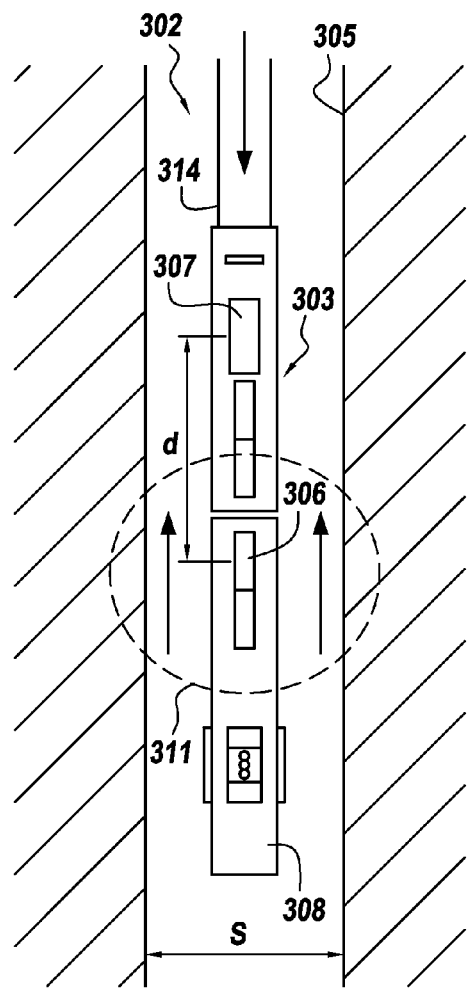
FIG.2   FIG.3
Prior Art

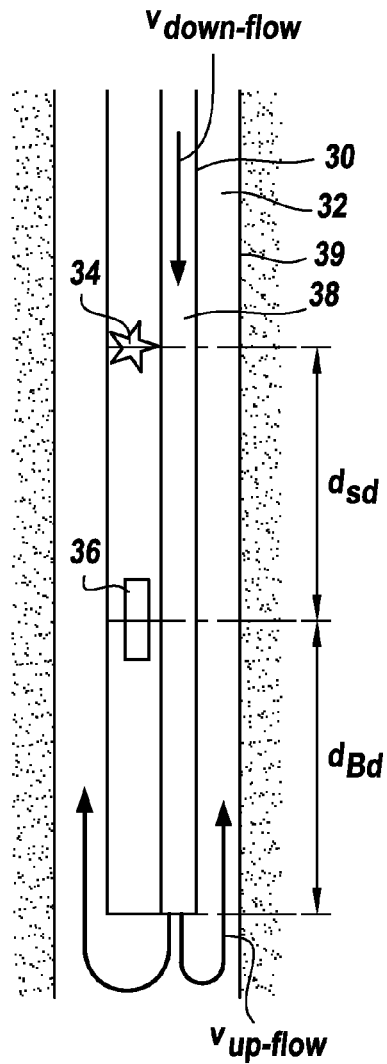
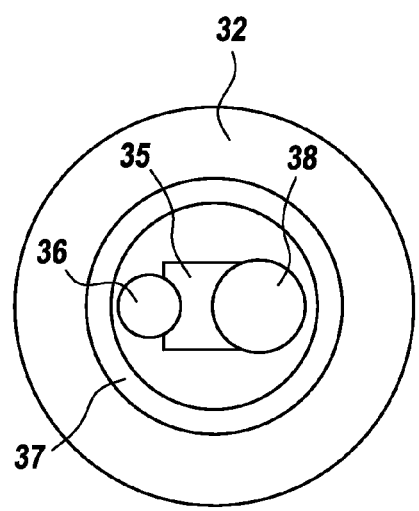
FIG.4a
FIG.4b

DETERMINING DOWNHOLE FLUID FLOW

FIELD OF THE INVENTION

The present invention relates to shielding and in particular, but not exclusively, to neutron shielding for downhole tools.

BACKGROUND OF THE INVENTION

Nuclear tools are used widely in the petrochemical industry, particularly during the so-called LWD (Logging While Drilling) stage, but also at other stages such as MWD (Measurement While Drilling) or Wireline. LWD is logging during the initial stage of drilling a hole down into the earths crust towards an identified hydrocarbon reservoir, which should eventually form a producing oil or gas well for fulfilling energy needs.

Although various surface techniques exist for characterizing subsurface formations, it is useful to use subsurface techniques for more accurate localized measurements of the surrounding rock formations. This becomes even more useful the deeper the drill progresses. In the case of LWD, the measurement or logging of such data as one progresses down the well, is useful in making more up-to-the-minute estimates as to whether the hydrocarbon reservoir is of sufficient quality to make it economically feasible for production. It also helps in deciding on the optimal location in the hydrocarbon formation to stop drilling and begin tapping the oil (or gas) contents of the reservoir.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment comprises a logging-while-drilling (LWD) module 120, a measuring-while-drilling (MWD) module 130, a rotary-steerable system and motor, and drill bit 105. The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a nuclear measuring device or neutron tool to measure, for example, the porosity of the surrounding formation.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

FIG. 2 shows a logging-while-drilling nuclear device as disclosed in U.S. Pat. No. Re. 36,012, incorporated herein by reference, which utilizes an accelerator-based source, it being understood that other types of nuclear LWD tools can also be utilized as the LWD tool 120 or part of an LWD tool suite 120A. In FIG. 2, a drill collar section 1040 is shown as surrounding a stainless steel tool chassis 1054. Formed in the chassis 1054 to one side of the longitudinal axis thereof (not visible in this view) is a longitudinally extending mud channel for conveying the drilling fluid downward through the drill string. Eccentered to the other side of the chassis 1054 are a neutron accelerator 1058, its associated control and high voltage electronics package 1060 and a coaxially aligned near-spaced detector 1062. The near-spaced detector 1062 is primarily responsive to accelerator output with minimum formation influence. The detector 1062 is surrounded, preferably on all surfaces except that adjacent to the accelerator 1058, by a shield 1064 of combined neutron moderating-neutron absorbing material. The output of the near detector 1062 is used to normalize other detector outputs for source strength fluctuation. Located longitudinally adjacent to the near-spaced detector 1062 is a plurality or array of detectors, of which 1066a and 1066d are shown in this view. The detector 1066a is back-shielded, as shown at 1068a. The array includes at least one, and preferably more than one, epithermal neutron detector and at least one gamma ray detector, represented in this example at 1084, with shield 1086. One or more thermal neutron detectors can also be included. The above-referenced U.S. Pat. No. Re. 36,012 can be referred to for further details. The detector signals can be utilized to determine, inter alia, formation density, porosity, and lithology.

Such nuclear/neutron tools are often used for measuring the porosity of the surrounding rock formations and hence, estimating the hydrocarbon (oil or gas) content.

There is a further important application of downhole nuclear tools, which is for measuring the rate of flow of fluid inside the borehole or from behind a well casing. Specifically, GB 2 399 111 describes how a slug of fluid of fluid is radio-actively activated by a pulsed nuclear source and measuring the time of flight (TOF) taken to reach a detector, which is spaced at a certain distance from the activating source. The TOF or time taken to travel the distance makes it possible to determine the fluid velocity or flowrate in the wellbore.

However, for systems that use a pulsed source, the pulsing is typically slow with intervals of seconds or more. This penalizes other measurements associated with the pulsed neutron source. For example, a possible pulsing scheme would have a one-second long activation pulse followed by a five-second gap, in which no neutrons are emitted by the generator. Assuming that the instantaneous neutron output is limited, this reduces the available number of neutrons for other measurements (porosity, spectroscopy, sigma among others) by a factor of six and therefore increases the statistical error of the measurement by more than a factor of two. At fast drilling speeds or in the presence of longer neutron-less intervals, entire formation intervals would not be logged as the tool bypasses them without probing them with neutrons. At a ROP (Rate of Progress) of 60 m/h, the tool progresses by 1 m/minute. In order to probe the formation continuously, irradiation should not stop for intervals exceeding approximately 10 cm. This means that the formation needs to be irradiated every 6 seconds. If one doubles ROP then the interval drops to 3 seconds. Thus, not only are pulsing schemes often too slow in regards to penalizing the other nuclear measurements of the formation, but also may lead to entire intervals that are not probed by the tool.

SUMMARY OF THE INVENTION

According to a first aspect of the invention there is provided an apparatus for determining properties of a borehole and a formation around the borehole, the apparatus comprising: a source for generating nuclear particles; a detector for measuring an effect of the nuclear particles on a fluid flowing in the borehole; a second detector for measuring an effect of the nuclear particles on the formation; and wherein the source is arranged to generate the nuclear particles in a manner that enables the measuring of the first and the second detector to be performed simultaneously.

The measurements being performed simultaneously and independently such that the measurement of the fluid property does not affect the measurement of the formation property or vice versa. Moreover, it is not necessary to require complex timing mechanisms for pulsing the source.

According to a further aspect of the invention there is provided a method for determining properties of a borehole and a formation around the borehole, the method comprising: generating nuclear particles; measuring a first effect of the nuclear particles on a fluid flowing in the borehole; measuring a second effect of the nuclear particles on the formation; and wherein the nuclear particles are generated such as to enable the measuring of the first and the second effects to be performed simultaneously.

According to yet a further aspect of the invention there is provided an system comprising: a logging while drilling tool on a drill string within a borehole, the tool having a source for generating nuclear particles and a detector for measuring a property of the formation based on an effect of the nuclear particles on the formation; an additional detector for measuring a property of a drilling fluid flowing in the borehole; and wherein the source is arranged to generate the nuclear particles in a manner that enables the measuring of the first and the second detector to be performed simultaneously.

BRIEF DESCRIPTION OF THE DRAWINGS

Embodiments of the present invention will now be described by way of an example with reference to the accompanying drawings, in which:

FIG. 2 shows a tool in which an embodiment of the invention can be employed;

FIG. 3 shows a prior art tool for determining the rate of fluid flow;

FIG. 4a shows a cross-section view of an embodiment of the invention;

FIG. 4b shows a plan view of an embodiment of the invention; and

SPECIFIC DESCRIPTION OF THE INVENTION

Figure 1:
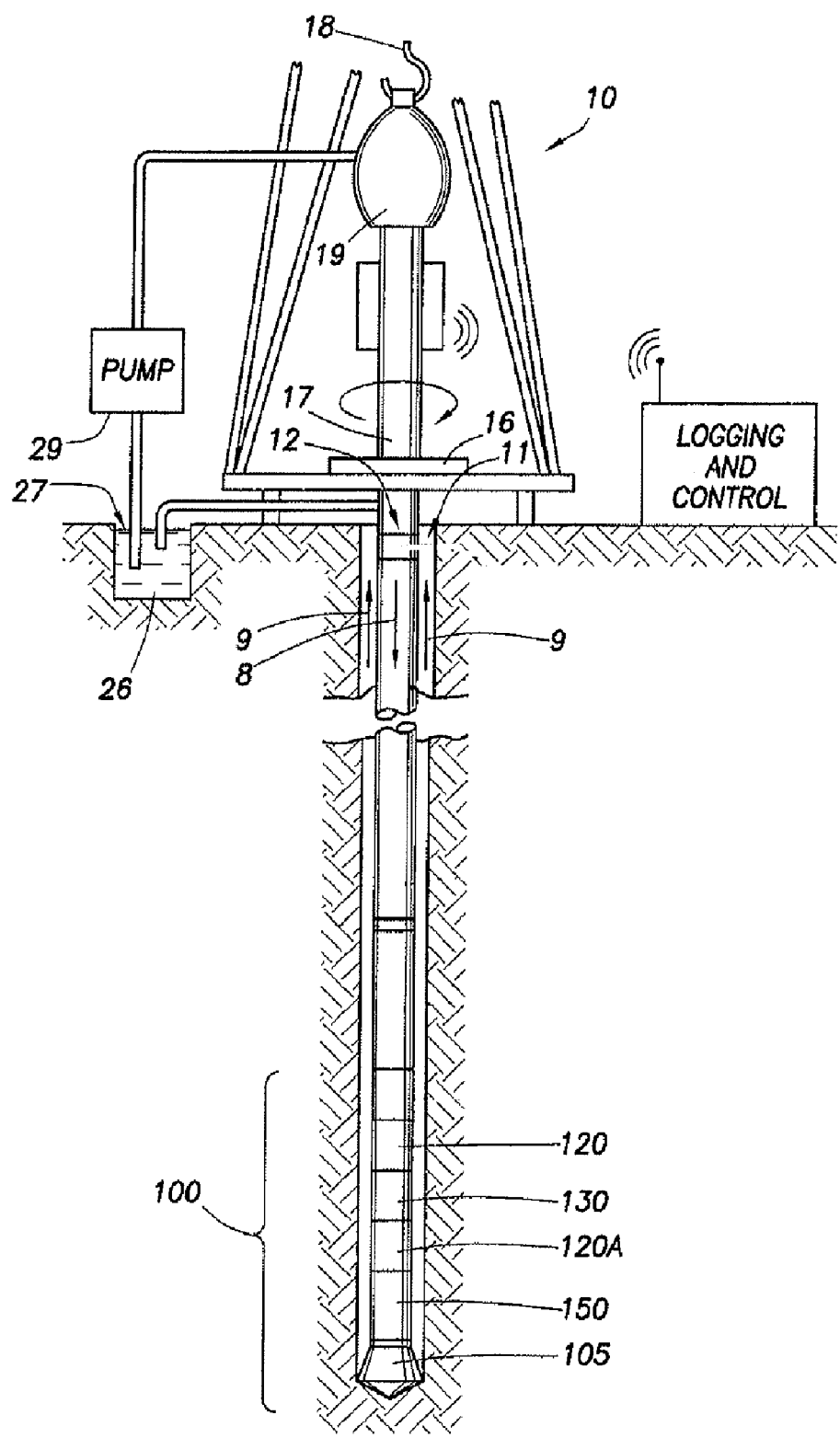
FIG. 1 shows a wellsite system in which an embodiment of the present invention can be employed.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Embodiments of the present invention rely on the activation of oxygen in the fluid flowing within a borehole. O-activation has been used for many years to determine the flow of water inside the borehole or behind casing. In LWD the O-activation of the fluid flowing down in the mud channel can be used to obtain a qualitative or semi-quantitative measurement of the mud flow. In the activation process, oxygen atoms in the produced fluid are transformed from stable atoms into radioactive atoms by the bombardment with high-energy neutrons. When an oxygen-16 atom (or 16-O) is hit by a neutron, a proton can be released out of the nucleus while the neutron is absorbed and a radioactive nitrogen-16 atom is produced. Nitrogen-16, with a half-life of about 7.1 seconds, decays to oxygen-16 by emitting a beta particle. The oxygen-16 that results from the beta decay of nitrogen-16 is in an excited state, and it releases the excitation energy by gamma ray emission. The gamma ray emission may be detected by a gamma ray detector.

FIG. 3 shows a prior art tool of GB 2 399 111, such as an LWD tool 303 in a wellbore 302. The LWD tool is part of the drill string 314. The LWD tool 303 includes, among other devices, an activation device, which in one embodiment is a Pulsed Neutron Generator (PNG) 306 and an activation detector, which in one embodiment is a gamma ray detector 307 that are spaced apart by a known distance d. The PNG 306 has an activation zone 311, within which nuclei are activated by the neutrons emitted from the PNG 306. Oxygen in the fluid is activated, as drilling fluid containing water produced from the formation flows upward (as indicated by the arrows) in the annulus between the LWD tool 303 and the wellbore wall 305, and passes through the activation zone 311. When the activated fluid passes near the gamma ray detector 307, the gamma rays emitted by the activated oxygen are detected.

Activation is not limited to the activation of oxygen. Other elements in the borehole fluid can be activated as well (e.g. Aluminum, Silicon and Barium). The activation of elements other than 16-O can be used for diagnostics on the borehole fluid composition and borehole fluid flow as well. It should be appreciated that specific materials could be added to the borehole fluid, which activate easily to obtain additional information.

The gamma ray detector 307 may be any conventional detector used in a neutron/gamma ray tool. In this case, the energy windows of the gamma ray detector 307 are set such that gamma rays emitted by activated oxygen are detected. Alternatively, the gamma ray detector 307 may be a specific detector for the gamma ray emitted by the activated oxygen. The fluid velocity in the annulus may be calculated using the time-of-flight (TOF) and the known distance d between the PNG 306 and the gamma ray detector 307. Equation 1 shows one formula for calculating the fluid velocity:

$$V_m = \frac{d}{t} \qquad (1)$$

where d is the distance between the PNG 306 and the gamma ray detector 307, t is the time-of-flight, and Vm is the velocity of the fluid. The fluid velocity may then be used to compute other downhole parameters such as the fluid volumetric flow rate.

FIGS. 4a and 4b show an embodiment of a downhole tool, such as an LWD tool 30 in a wellbore 32. Specifically, FIG. 4a shows a cross section view of an embodiment of the tool 30, whereas FIG. 4b shows a plan view of an embodiment of the tool. In the LWD example the wellbore is also known as the annulus 32 in which the fluid or drilling mud flows upward. More specifically, the annulus is the region between the LWD tool 30 and the wellbore wall 39.

In contrast to FIG. 3, the embodiment of FIG. 4a shows that the relative positions of the source and detector within the tool are inverted. While it is not essential that the source is above (i.e. closer to the surface) the detector, the embodiment of FIG. 4a shows that the fluid velocity of the upflow is now also able to take into account the velocity of the downflow in the mud channel. Specifically, FIG. 4a shows that the fluid flowing down gets activated by the source 34, exits at the drillbit and flows back up on the outside of the drill collar 37 towards the surface. The gamma-ray detector 36 located below the activating neutron source 34 is able to detect the oxygen decay signal of the activated fluid flowing back up. Importantly, this observed signal is a function of the down-flow and up-flow speeds. A significant change in the observed signal from the up-flow indicates a change in the up-flow rate because of borehole enlargement, fluid loss from or fluid entry into the borehole.

Thus, the tool in the embodiment is capable of detection changes in the downhole flow in real time through the use of the O-activation method, which does not require any pulsing of the neutron generator, merely that the instantaneous neutron output of the source be known. The neutron output is measured by the neutron monitor. At every instant the number of neutrons exiting the tool is known. However, the neutron source will most likely be pulsed at a high rate, i.e. in time intervals that are orders of magnitude shorter than the decay time of 16-O. This allows all the neutron-based downhole measurements in the tool to proceed normally. The measurement just requires the addition of a gamma-ray detector at a distance from the source to measure the fluid activation.

The prior art pulsed systems are useful to make a standalone measurement of the mudflow, whereas at least one embodiment is concerned with configuring a source such that the downhole tool is able to measure both the mudflow and at least one, if not more formation property.

In the embodiment shown in FIG. 4a, the LWD tool 30 is part of a drill string and the tool 30 includes, among other devices: an activation device and an activation detector. In one embodiment the activation device is a neutron source 34 of energetic neutrons (E>10 MeV) and the activation detector is a gamma ray detector 36 having a spectroscopy capable of distinguishing between the activated oxygen and natural gamma radiation. The source has an activation zone (not shown), within which nuclei in the passing fluid are activated by the neutrons emitted from the source 34. Oxygen in the fluid is activated, as drilling fluid containing water flows downward (as indicated by the arrow $v_{down-flow}$) in the mud channel 38. The down-flow represents the mud pumped down from the surface. The mud exits at the drillbit and is circulated back up on the outside of the drill string, in the annulus 32 as indicated by the arrow $v_{up-flow}$, and carries with it the solids generated as the drill bit cuts a hole in the formation.

The detector 36 is spaced apart from the source 34 by a known distance $d_{sd}$. The detector 36 is also spaced apart from the bottom of the tool 30 by a known distance $d_{Bd}$.

It should be appreciated that the detector 36 is for measuring the fluid properties. However, there is another detector (not shown) which is used for measuring a property of the formation that can be determined from the neutrons produced by the neutron source 34. Thus the neutron source 34 enables both measurements to be performed and they are not affected by one another.

When the activated fluid reaches the gamma ray detector 36 for the first time it will correspond to activation in the down-flow. Since the flowrate and the distance $d_{sd}$ are known, the activation in the mud-channel 38 can be predicted. Specifically, the amount of activation of the fluid passing by the neutron generator is determined by the speed of the fluid. As the speed increases the fluid spends less time in front of the neutron source and therefore gets activated less. The flow rate in the absence of fluid losses or fluid entry is known from the downflow rate, which is measured at the surface and the borehole geometry (cross section of the annulus around the tool string) determined from the diverse caliper measurements of the tool.

It is possible to predict the velocity of the fluid flowing upward in the annulus, since the distance from the drillbit to the detector is also known for this measurement. Specifically, detector 36 is able to detect the activated oxygen, or at least part of it, a second time when it passes upward. Therefore, the detector detects O-activation twice, once during the down-flow and again during the up-flow.

It should be appreciated that in the event of a total fluid loss, all of the fluid pumped down, i.e. the down-flow, will dissipate into the surrounding formation. Also, fluid in the annulus will escape into the formation by moving down under the effect of gravity. This will result in massive activation being seen by a gamma-ray detector below the PNG.

Special shielding can be used between the detector and the mud channel to reduce the number of oxygen gamma-rays reaching the detector from this side. Since the neutron output of the generator is not pulsed no determination of the TOF is possible. Only the intensity of the activation can be observed. Since the distances are given, the amount of activated oxygen that is observed will depend strongly on the flow velocity outside of the tool (up-flow). This can also be achieved for down-flow as indicated in the description of total fluid loss above. Any change in the flow velocity will result in a change in the observed activation.

If the flow is slower, then more oxygen will have decayed to its ground state before reaching the detector. A slower up-flow rate indicates either an increase in borehole diameter or a loss of fluid, since the down-flow rate is assumed to be constant (given by the mud pumps). A faster up-flow rate would indicate influx of fluid from the formation. The resulting dilution of the fluid with formation fluid that is not activated will also lead to a reduction of the observed O-signal.

A detector placed above the neutron source would see the change caused by an increase in flow rate. Depending on the mud velocity and the chosen spacing between the source and detector, an increase or decrease would be seen. If oil based mud is displaced by water from the formation an increase in O-activation above the source would be observed.

At least some of the activated fluid is likely to pass the detector 36 again at a later time when it returns upward in the annulus. Some of the drilling fluid exiting the mud channel at the bottom of the tool 30 may enter into the formation itself, particularly if there are pressure differentials or fractures in the borehole wall, but most of it will return upward in the annulus.

The observed gamma-ray rate will vary as a function of the mudflow and the time the activated oxygen spends from the time it is activated until it arrives near the gamma-ray detector 36 during the upflow from the bit. A drop in the O-gamma-ray count rate is an indication that the up-flow past the tool is significantly slower or that the composition of the mud is changing. Such a change can be a strong indicator of fluid loss or fluid influx and can give a very early warning to the driller.

Some of the activated oxygen will decay as it passes the detector 36 on the way down. This signal can be reduced by increasing the lateral distance between the mud channel 38 and the natural gamma-ray detector 36 and/or by inserting dense, high-Z shielding material 35 between the mud channel 38 and the detector 36 as shown in FIG. 4b. If an electronic neutron generator is used it must be equipped with a device to monitor the neutron output, as the activation changes proportionally to the neutron output.

The activated fluid reaches the drillbit and exits into the borehole, where it is being pushed upward between the drill collar and the borehole wall. The speed of the upflow is a function of the mud flow rate (m³/s) and the cross section of the annulus between tool and borehole wall. An increase in the average cross section of the borehole below the gamma-ray detector will result in a slower flow speed and thus increase the time between activation and detection. The longer time-of-flight (TOF) results in a reduced activity due to the decay of the activated oxygen. Since generally TOF is lower or at most of the order of the 7-s half-life of $^{16}$N (the activated oxygen), changes in activation caused by flow changes tend to be small unless there is a change in the downflow rate and/or the composition of the mud (change in O-content).

Should there be significant fluid loss or fluid entry into the borehole some of the activated Oxygen will be lost or the activated oxygen will be diluted by the inflow. In either case a measurable reduction in the oxygen activation signal will be found.

Once there is a suspicion of fluid loss or fluid entry, in one exemplary embodiment the operating mode of the neutron source is changed through a command from the surface and the actual TOF could be measured to obtain the flow velocity. In another embodiment, the tool can be setup to automatically change the pulse mode if the downhole software detects an O-activation anomaly. That is, a change in pulse mode for this embodiment means that although fast pulsing is continued, a slower pulsing scheme known from the prior art may be superimposed on it. Thus, it is possible to utilize the benefits of the slower pulsing scheme in giving an exact determination of the flow rate, while still allowing neutron measurements of the formation. This embodiment might be applicable if for example there are indications that the down-hole flow rate has changed and an intervention may be required.

Table 1 summarizes the essential parameters affecting the mud flow, the mud activation and the observed O-signal. In the exemplary table it is assumed that the gamma ray detector is positioned 3.5 m below the neutron generator. It therefore detects gamma rays from both down-flow and up-flow of the drilling fluid in the borehole. Due to the small cross sectional area of the mud channel, the downflow is much faster than the upflow.

TABLE 1

| Flow direction | Variable | Value | | Remark |
|---|---|---|---|---|
| Downflow | Flow Rate (F) | 400 gpm | 0.025 m³/s | Flow rates can vary widely depending on the tool, the drillstring and the drilling conditions |
| | Mud channel ID (D) | 2 in. | 0.051 m | Size varies with tool size and construction |
| | Mud channel cross section ($A_{mud}$) | $A_{mud} = \pi (D/2)^2$ | 0.00203 m² | Cross sectional area of mud channel for ID above |
| | Flow velocity | $v_d = F/A$ | 12.4 m/s | Computed flow velocity |
| | Activation time | $t_{act}$ | 24 ms | Assumes an activation length of 0.3 m |
| | Mud activation | $O_{act} = c \cdot (1 - e^{-\frac{t}{\tau}})$ | $2.3 \times 10^{-3}$ c | Activation is at 0.23% of the maximum achievable activation The parameter c depends on the neutron output, and the activation geometry near the source. |
| | Distance Source-NGR ($d_{sd}$) | $d_{sd}$ | 3.5 m | Distance varies with tool construction and BHA. Typically a minimum distance of about 2.5 m is required to avoid any influence from neutron induced gamma-rays produced near the source. |

TABLE 1-continued

| Flow direction | Variable | Value | | Remark |
|---|---|---|---|---|
| | Travel time to detector ($t_{sd}$) | $t_{sd} = d_{sd}/v_d$ | 0.28 s | For given flow rate and dimensions |
| | $^{16}$N Half life | $T_{1/2}$ | 7.13 s | Other elements in the mud that may get activated have longer half-lives. |
| | Fraction of $^{16}$N remaining in mud at NGR($F_{act}$) | $F_{act} = \exp(-t_{sd}/\ )$ | 0.97 | Exponential decay of activated $^{16}$O while traveling from the PNG down to the detector = $T_{1/2}/\ln(2)$ |
| Upflow | Borehole diameter (BS) | 8.5 in. | 0.216 m | Typical borehole/drill bit size |
| | Average BHA OD below NGR ($D_{BHA}$) | 6.75 in. | 0.17 m | Typical OD of some LWD tools |
| | Annular cross section ($A_{ann}$) | $A_{ann} = (BS^2 - D_{BHA}^2)/4$ | 0.135 m$^2$ | |
| | Upflow speed ($v_{up}$) | $v_{up}$ | 1.86 m/s | For larger borehole diameters the up-flow speed for a given flow rate will decrease |
| | Distance NGR-Bit ($d_{GR-Bit}$) | $d_{GR-Bit}$ | 2.45 m | Shortest possible distance from natural gamma-ray detector to bit. Distances may easily reach 10 m or more. |
| | Time from bit to GR ($t_{up}$) | $t_{up} = d_{GR-Bit}/v_{up}$ | 1.3 s | This time will increase if the GR-detector is farther from the bit, the borehole is larger or the flow rate is lower. |
| | Fraction of $^{16}$N remaining in mud at bit ($F_{bit}$) | $F_{bit} = \exp(-(t_{sd} + t_{GR-Bit})/\ )$ | 0.95 | Decay from the time the mud is activated near the PNG until the mud reaches the bit |
| | Fraction remaining in upflow at NGR ($F_{up}$) | $F_{up} = F_{bit} * \exp(-t_{up}/\ )$ | 0.86 | Decay of activated O from time activation until detected in the up flow |

In the extreme case that most of the mud exiting the drillbit is lost and does not circulate back up, most of the O-activation signal in the gamma-ray detector will disappear. Or in the case of total loss even the fluid in the annulus will flow down. In the latter case a very large amount of activation will be observed. For an accurate measurement it would be preferable to measure the flow rate (flow velocity) in the mud channel, since, at fast flows (short activation), the activation is inversely proportional to the flow velocity.

If there is a sudden major influx into the borehole near the bit, the additional fluid will dilute the $^{16}$N (activated oxygen) and the oxygen signal will decrease.

If an electronic neutron generator is used, for example a PNG, the O-activation signal needs to be properly normalized by the neutron output. In general this can be done without taking into account TOF, as the neutron output generally varies very slowly. In most cases, the neutron output is adjusted automatically to keep a constant output.

Figure 5:
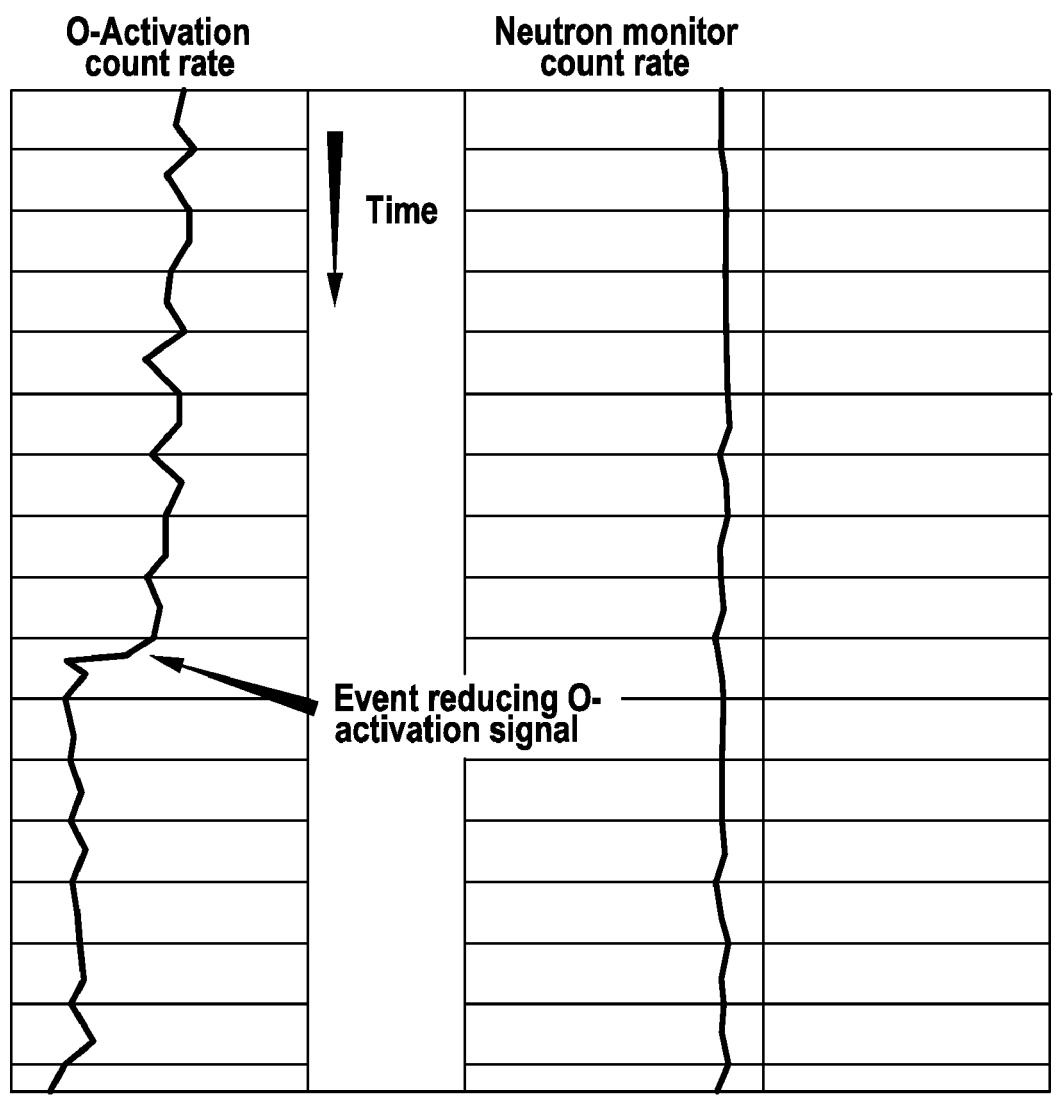
FIG. 5 shows examples of observed signals.

FIG. 5 shows a schematic display of a real-time log, indicating the change in O-activation as the up-flow is reduced due to fluid losses. Specifically, the real-time log showing a sharp reduction in O-activation at the indicated time, whereas the neutron output represented by the neutron monitor count rate is practically constant. This indicates that the drop in activation is not cause by a change in the neutron output.

That is, the neutron monitor count rate indicates a practically constant neutron output from the source 34, which in turn means a constant amount of activation as the mud passes the source on its way down. However, some of the mud is lost to the formation after it exits the drillbit, which reduces the speed of the up-flow. Since the up-flow is slower, more of the activated oxygen decays before reaching the detector on its way up.

In a further embodiment, there is more than one gamma-ray detector located below the source. Each detector having a different sensitivity to the activation in the mud channel, which is used to distinguish between the down-signal and the up-signal. This can be enhanced by acquiring full spectra in both detectors. The sensitivity can be tuned by having one detector with minimal shielding between the detector and the mud channel, while the second detector is strongly shielded so as to suppress the gamma rays from the mud channel. This strong contrast in shielding makes it possible to discriminate between the mud channel and the borehole signal. The two detectors can be at the same axial position or only slightly displaced axially to insure that they see virtually the same mud channel signal.

In a further embodiment, there are detector(s) located above and below the source. The detector(s) above the source will see strong activation of the mud and the formation. This is because the source activates the mud flowing up past it. This activation is much stronger than the activation on the way down due to the slower speed of the mud. A decrease in the activation signal above the source would indicate mud losses above the source between the source and the detector, which would be several meters further uphole. At certain drilling speeds, in particular if the spacing between the generator and the detector is short, formation O-activation may disturb the measurement. The formation activation should not contribute to the O-window, unless there is pileup. The detector above is sensitive to changes in the mud composition (oil/water). However, borehole size irregularities will modulate the activation.

In the event of total loss of circulation where the mud in the annulus is flowing down as well, the upper detector will not see any activation any longer. This can be a very early indication of catastrophic fluid losses. Total fluid loss is an undesirable condition, but a driller (or surface user) is able to detect this early by observing a large increase in activation during annular downflow.

In another embodiment gamma-rays from other activated isotopes in the borehole are detected in addition to, or instead of, measuring O-activation. Simultaneous measurement of O-activation and activation of other elements can be achieved through the use of a gamma-ray spectroscopy detector, which allows distinguishing between the gamma-ray characteristic of different elements.

It should be appreciated that the gamma-ray detectors do not have to be in the same tool as the neutron generator. Specifically, the neutron generator will normally be in an LWD tool used to measure formation properties. The additional gamma-ray detector can be in a different tool (tool housing) below and/or above the source.

It should be appreciated that in a given commercial implementation of an LWD tool, the tool may include a variety of circuitry, in addition to various other emitters and sensors, depending on the design of the tool. The precise design of, for example, the control and processing circuitry of the LWD tool is not germane to this invention, and thus is not described in detail here. However, at a minimum, it should be understood that the tool will include control circuitry for controlling the source and/or detector measurements.

Such control circuitry might include processing circuitry that is capable of performing the calculation of fluid velocity or various other calculations as set forth in the embodiments described. The processor results can either be output to a storage medium (for later retrieval) or an output device (for transmission to the surface via a communication channel). Various types of and configurations for such devices exist and are known to those skilled in the art.

Thus, an embodiment of the invention is concerned with measuring the O-activation signal in addition to the other formation measurements that are already being performed. What is detected is a change in the amount of activated oxygen. This change can be caused by a change of the mud composition due to fluid influx from the formation, which will also be accompanied by a change in the up-flow rate. Alternatively, if there are significant mud losses below the drillbit the flow rate will drop and the oxygen signal will decrease because less activated oxygen reaches the detector during the up-flow.

The invention claimed is:

1. A tool for drilling a borehole having an apparatus for determining a change in a drilling environment around the borehole, said apparatus comprising:
   a source for generating neutrons to produce a radioactive isotope in a fluid flowing down inside the tool;
   a detector for detecting a change in gamma-ray radiation created from decay of the radioactive isotope when the fluid flows back up outside the tool; and
   processing circuitry for relating the detected change in the gamma-ray radiation to the change in the drilling environment, said drilling environment change including borehole enlargement, fluid loss from the borehole or fluid entry into the borehole.

2. The tool of claim 1, wherein the source is a radioisotope source.

3. The tool of claim 1, wherein the source is a pulsed neutron generator.

4. The tool of claim 3, wherein said apparatus further comprises a monitor for measuring a neutron output from the pulsed neutron generator so as to allow a normalization of gamma-ray count rate observed by the detector with respect to the neutron output.

5. The tool of claim 3, wherein the operating mode of the pulsed neutron generator is changed either automatically or by a command from the surface after detection of said radiation change.

6. The tool of claim 5, wherein the pulsing of the pulsed neutron generator after the change in the operating mode has a substantially longer "off" time than "on" time so that a velocity of the fluid can be determined through time of flight.

7. The tool of claim 6, wherein the fluid velocity is determined based on the time between activation and detection of activation.

8. The tool of claim 1, wherein the neutrons generated are capable of activating $^{16}O$ in the fluid.

9. The tool of claim 1, wherein the detector is positioned below the source.

10. The tool of claim 9, wherein said apparatus further comprises a second detector positioned above the source for detecting compositional changes of the fluid.

11. The tool of claim 1, wherein the detector discriminates gamma-ray radiation based on energy.

12. The tool of claim 11, wherein the detector is capable of detecting Oxygen in the fluid based on detection of gamma-ray radiation having an energy level that exceeds a predetermined value.

13. The tool of claim 1, wherein Oxygen is detected based on an acquired gamma-ray spectrum.

14. The tool of claim 1, wherein the detector detects a drop in the gamma-ray radiation, and wherein said processing circuitry relates the radiation drop to an indication of an enlarged borehole, a fluid loss into the formation or entry of formation fluid into the borehole.

15. The tool of claim 1, wherein the detector detects an increase in the gamma-ray radiation, and wherein said processing circuitry relates the radiation increase to an indication of a fluid loss leading to reverse flow in an annulus outside the tool.

16. The tool of claim 1, wherein the tool is assembled as part of a drill string, and wherein the fluid flows from the surface down through the drill string via a channel and back up to the surface in an annulus between the drilling string and a borehole wall.

17. The tool of claim 16, wherein the detector is shielded from the channel such that the detector is substantially more sensitive to gamma-ray radiation in an up-flow fluid.

18. The tool of claim 17, wherein said apparatus further comprises a second detector positioned below the source that is not shielded from the channel, said second detector is substantially more sensitive to gamma-ray radiation in a down-flow fluid.

19. The tool of claim 1, wherein the fluid has a down-flow speed and an up-flow speed and the detected change in the gamma-ray radiation is a function of the up-flow and down-flow speeds and relates to the change in the drilling environment.

20. A method for determining a change in a drilling environment around a borehole, comprising:
- generating neutrons to produce a radioactive isotope in a fluid flowing down in the borehole;
- detecting a change in gamma-ray radiation induced by decay of the radioactive isotope when the fluid flows back up in the borehole; and
- relating the change in the induced gamma-ray radiation to the change in the drilling environment around the borehole, said drilling environment change including borehole enlargement, fluid loss from the borehole, and/or fluid entry into the borehole.

21. A method according to claim 20, wherein detecting a change in gamma-ray radiation comprises detecting gamma rays from both down-flow and up-flow of drilling fluid in a borehole.

\* \* \* \* \*